United States Patent [19]

Saini et al.

[11] Patent Number: 5,383,179
[45] Date of Patent: Jan. 17, 1995

[54] MESSAGE ROUTING METHOD IN A SYSTEM HAVING SEVERAL DIFFERENT TRANSMISSION CHANNELS

[75] Inventors: Jasjit S. Saini, Rosenwiller; Pierre Troian, Hoenheim, both of France

[73] Assignee: Laboratoire Europeen de Recherches Electroniques Avancees, Courbevoie, France

[21] Appl. No.: 90,435

[22] Filed: Jul. 12, 1993

Related U.S. Application Data

[63] Continuation of Ser. No. 845,798, Mar. 9, 1992, abandoned, which is a continuation of Ser. No. 543,794, Jul. 27, 1990, abandoned.

[30] Foreign Application Priority Data

Dec. 15, 1988 [FR] France ............... 88 16550

[51] Int. Cl.6 ............... H04L 12/46; H04L 12/56
[52] U.S. Cl. ............... 370/54; 370/85.13; 370/94.1; 340/825.52
[58] Field of Search ............... 370/60, 85.9, 85.13, 94.1, 94.3, 370/54, 94.2; 340/825.52, 825.53

[56] References Cited

U.S. PATENT DOCUMENTS

| | | | |
|---|---|---|---|
| Re. 33,426 | 11/1990 | Sugimoto et al. | 370/85.13 |
| 4,081,612 | 3/1978 | Hafner | 370/60 |
| 4,627,052 | 12/1986 | Haare et al. | 370/85.13 |
| 4,706,080 | 11/1987 | Sinooskie | 370/85.13 |
| 4,872,162 | 10/1989 | Tanaka et al. | 370/94.1 |
| 4,972,409 | 11/1990 | Backes | 370/94.1 |

FOREIGN PATENT DOCUMENTS

2320022 2/1977 France .
8400266 1/1984 WIPO .

OTHER PUBLICATIONS

IEEE Network, vol. 2, No. 1, Jan. 1988, IEEE, (New York, US), M. C. Hamner et al.: "Source routing bridge implementation", pp. 33–36.
The Eureka Integrated Home Systems Project (EU 84), Extracts from: Draft Architecture and Command Language Specification Document, pp. 1–16.

Primary Examiner—Wellington Chin
Assistant Examiner—Hassan Kizou
Attorney, Agent, or Firm—Oblon, Spivak, McClelland, Maier, & Neustadt

[57] ABSTRACT

In order to know, for the purpose of a response, the route taken by a message packet flowing in a transmission system having several different transmission channels, several fields (RA0 to RA2) are reserved in this message in which fields are entered the identities of the interfaces passed through by the message passing from one channel to another.

8 Claims, 1 Drawing Sheet

MESSAGE ROUTING METHOD IN A SYSTEM HAVING SEVERAL DIFFERENT TRANSMISSION CHANNELS

This application is a continuation of application Ser. No. 07/845,798, filed on Mar. 9, 1992, now abandoned, which is a continuation of application Ser. No. 07/543,794, filed Jul. 27, 1990, abandoned.

BACKGROUND OF THE INVENTION

1. Field of the Invention

The present invention relates to a communications system comprising a message routing method in a system having several different transmission channels.

2. Description of the Related Art

A large number of units which can be either message transmitters or message receivers can be organized in various ways.

One way consists in using several communications channels. Each of these channels is often called a "bus". Each unit of the system desiring to correspond with another unit in this system generally sends a data packet comprising, in addition to the "data to be transmitted" section, "routing" data indicating the paths between different communications channels and possibly the identity of the transmitting unit, and miscellaneous data (error correction codes, acknowledgement of reception, etc . . . ). Such a system functions correctly, but when simple units intended for the general public (sensors, lamps, etc.) are used, it is necessary to add routing storage means to them and to inform them i.e. to enter this routing data, which clearly increases their cost and their complexity.

A transmission protocol for such a system is known from the document "EUREKA 84 Integrated Home Systems Project", ISO/IEC ITC1/SC83WG1 N28 83/WG1 (RYAN 2) of July 1988 or from the Japanese document "Home Bus System" (HB.S)ISO/IEC ITC1/SC83/WG1 N42 of September 1988.

SUMMARY OF THE INVENTION

The subject of the present invention is a message routing method in a system having several different transmission channels, several different units being able to be attached to each transmission channel, a unit attached to a channel being able to communicate with another unit of any channel in the system.

The method of the invention consists in adding, in each message sent by a unit, in addition to the addresses of the transmitting unit and of the destination unit, at least one space for the identification of transition points between different transmission channels. This addition is made possible by means of data contained in the circuits on the transition points between the various communications channels.

According to one aspect of the method of the invention, the receiving unit immediately returns a response to a message by including in it reduced routing fields of the received message (sic).

BRIEF DESCRIPTION OF THE DRAWINGS

The present invention will be better understood on reading the detailed description of an embodiment of the method, taken by way of non-limitative example and illustrated by the appended drawing in which.

DESCRIPTION OF THE PREFERRED EMBODIMENT

Figure 1:
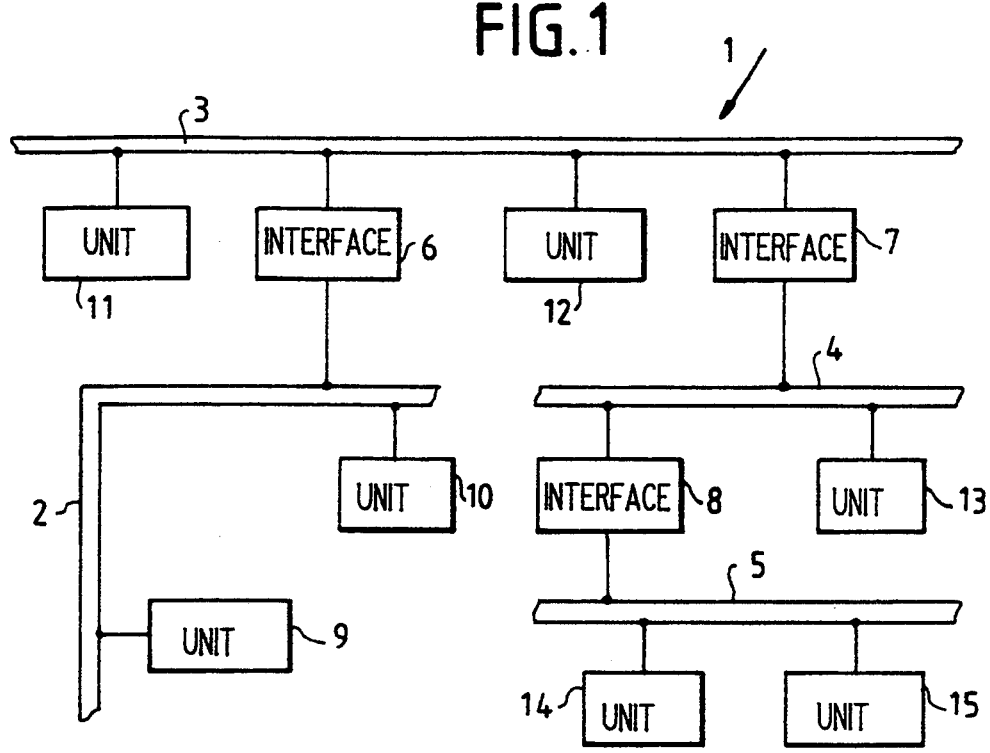
FIG. 1 is a simplified block diagram of a transmission system to which the method of the invention is applied.

The message transmission system 1 partially shown in FIG. 1 is for example the integrated home system of a flat. Such an integrated home system allows the interconnection of practically all of the electronic and electrical devices of a flat: surveillance systems, household electrical devices, audio systems, video systems etc . . . Given that these devices are of different types and transmit signals having different characteristics, they do not generally send or receive their useful signals (alarm signals, remote control signals, picture signals, sound signals . . . ) by the same transmission channels. These channels can be of different types depending on these useful signals: twisted pairs of wires, coaxial cables, optical fibres, high frequency links, infra-red links . . .

The system 1 comprises four different transmission channels referenced 2 to 5 respectively. These channels can all be of different types, or certain of them can be of the same type. In the case in which for example two channels are of the same type, for example twisted pairs of wires, they are not directly connected to each other for various reasons: galvanic isolation necessary between them (different voltages or devices which must be isolated from each other), too many user devices to be able to be connected to a single channel (addressing complexity), interference, etc . . .

The various channels 2 to 5 are connected to each other by appropriate transition points or interfaces: interface 6 between the channels 2 and 3, interface 7 between the channels 3 and 4 and interface 8 between the channels 4 and 5.

In FIG. 1 only a few of the units connected to the channels 2 to 5 have been shown. These are respectively the units 9 and 10 for the channel 2, the units 11 and 12 for the channel 3, the unit 13 for the channel 4 and the units 14 and 15 for the channel 5.

Figure 2:
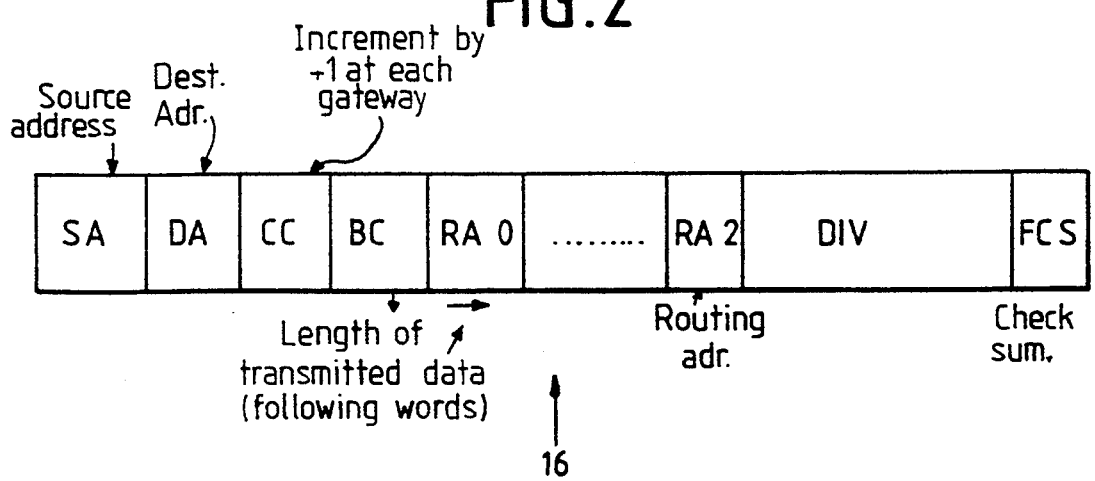
FIG. 2 is an example of a message according to the invention.

In order to communicate between each other, the users of the system 1 send messages in data packet form. Each packet is generally in the form of the packet 16 shown in FIG. 2. This form is of course taken only by way of example and can vary.

The packet 16 comprises several "fields" or successive code words. These fields are, in the order of transmission:

SA: source address, i.e. the address of the unit sending the message

DA: destination address of the message

CC: number of interfaces passed through by the message since leaving the transmitter.

BC: length of the packet beyond the field BC

RA0 to RA2: identity of the interfaces passed through and/or identity of the channels passed through. These three fields do not exist on leaving the transmitting unit if the latter is not an "intelligent" unit (a unit without storage means, a sensor for example). In the opposite case (for example a security controller), these fields are present when the message is transmitted. In the example described here o#a non-intelligent unit, these fields are added as the interfaces and/or channels used are passed through, in the order RA0 to RA2. The number of these fields is of course a function of the maximum number of interfaces and/or channels through which a message can be passed.

DIV: this reference covers one or more fields the number and content of which are a function of the nature of the system, of the possible transmission standards used and of the useful data transmitted from the transmitting unit to the receiving unit.

FCS: data for checking correct reception (Cyclic Redundancy Check C.R.C or "Check Sum" for example). The relative arrangement and encoding of the various fields in the packet can of course be different and their number can be different, depending on the transmission standards used, for example the field BC can be omitted or be placed in another location in the packet, or its significance can be different. The important characteristic is that the packet comprises fields RAn (where n is greater than or equal to 0) which are added each time an interface is passed through (or at each change of channel). The content of each field RAn serves to identify and/or locate the interface and/or the current transmission channel.

Assume for example that a message has to be transmitted from the unit 9 to the unit 15. The message M0, flowing in the bus 2 contains the data 9 relating to the source address (SA) and the data 15 relating to the destination address (DA). The message M1 flowing in channel 3 comprises the following data: SA=6, DA=15, RA0=9. The data SA=6 is added by the interface 6. The message M2 flowing in channel 4 comprises the following data: SA=7, DA=15, RA0=9 and RA1=6. Finally the message M3 flowing in channel 5 comprises the following data: SA=8, DA=15, RA0=9, RA1=6 and RA2=7.

The routing data thus programmed, and those transmitted by "intelligent" units, can be introduced in specific fields of the transmitted packet, or can complete the destination address in the DA field, the RAn fields being filled only when passing through interfaces.

Another operating mode consists in causing a message to be sent by an "intelligent" unit to any destination unit and in particular a "non-intelligent" destination unit. This message arrives at the destination unit provided with these fields RA0 to RAn added one by one on passing through the various transition points. The destination unit carries out a simple processing on this message (for example the adding of a datum such as "in operating condition", or "failed") and immediately sends a response containing the fields SA, DA and RA0 to RAn appropriately arranged.

We claim:

1. A method for routing a message in a system comprising several different types of transmission channels and several different units with each one of said transmission channels being attached to at least one of said several different units, said several different units including interface units which link transmission channels at transition points, wherein each respective unit attached to a channel may communicate with another unit in the system, comprising the steps of:
    adding to a data packet, which includes a source address field containing a source address representing an address of a source unit and a destination address field containing a destination address representing the address of a destination unit, transition point data identifying transmission points crossed by said data packet, said transition point data added when a transition point is crossed consisting of the replacement of the content of said source address field by an address of said transition point, the former content of said source address field becoming an entry into a routing information field, whereby said routing information field includes a sequence of addresses of transition points which have been passed through,
    sending said packet from said source unit to said destination unit.

2. A method for routing a message in a system comprising several different types of transmission channels and several different units, each transmission channel attached to at least one of said several different units, said several different units including respective interface units which link respective different type of transmission points, wherein each respective unit attached to a transmission channel may communicate with another unit in the system, comprising the step of:
    sending a data packet from a source to a first type of transmission channel, wherein said data packet includes a source address field containing a source address representing an address of the source unit, a destination address field containing a destination address representing an address of a destination unit, and a routing information field including at least one space for identification of transition points through which said message passes to reach said destination unit;
    adding transition point data to said data packet each time said data packet passes a transition point linking said different types of transmission channels, wherein said transition point data comprises a sequential series of identification of each of said transition points crossed between said different types of transmission channels, wherein said added transition point data added when said data packet passes a transition point consists of the replacement of the content of said source address field by an address of said transition point, the former content of said source address field becoming an entry into the routing information field, wherein said routing information field includes a sequence of addresses of transition points which have been passed through; and
    receiving said data packet at said destination unit, wherein said data packet includes routing data indicating the identity of each of said transition points passed through.

3. The method according to claim 1 or 2, further comprising the step of:
    returning a response to said routed packet received by said destination unit, said response including in it routing information fields derived from said received packet and which identifies said transition points.

4. The method according to claim 1 or 2, wherein said data adding step is carried out by circuits at the transition points which add to the packets passing through them the addresses of respective transition points.

5. A method for routing a message in a system comprising several different types of transmission channels on several different units with each one of said transmission channels being attached to at least one of said several different units, said several different units including interface units which link transmission channels at transition points, wherein each respective unit attached to a channel may communicate with another unit in the system, comprising the steps of:

adding to a data packet, which includes a source address field containing a source address representing an address of a source unit and a destination address field containing a designation address representing the address of a destination unit, routing data identifying channels passed through by said data packet, said routing data being added when a transition point is crossed and consisting in the replacement of the content of said source address field by information identifying the channel which has been passed through, the former content of said source address field becoming an entry into a routing information field, whereby said routing information field includes a sequence of routing data identifying the channels which have been passed through, sending said packet from said source unit to said destination unit.

6. The method according to claim 5, wherein said data adding step is carried out by circuits at the transition points which add to the packets passing through them the addresses of the respective transition points.

7. The method according to claim 5, further comprising the step of:

returning a response to said routed packet received by said destination unit, said response including in it routing information fields derived from said received packet which identifies said transition points.

8. A method according to one of claims 1, 2 or 5, wherein at least two of said source and/or said destination units do not memorize the information included in said routing information field.

* * * * *

UNITED STATES PATENT AND TRADEMARK OFFICE
CERTIFICATE OF CORRECTION

PATENT NO. : 5,383,179
DATED : January 17, 1995
INVENTOR(S) : Jasjit S. SAINI, et al.

It is certified that error appears in the above-indentified patent and that said Letters Patent is hereby corrected as shown below:

On the title page, Item [30], the PCT information has been omitted from the Foreign Application Priority Data. It should read:

--Dec. 12, 1989 [PCT] PCT.....PCT/FR89/00644--

Signed and Sealed this

Ninth Day of January, 1996

Attest:

BRUCE LEHMAN

*Attesting Officer*      *Commissioner of Patents and Trademarks*